(12) United States Patent
Watanabe et al.

(10) Patent No.: US 8,250,110 B2
(45) Date of Patent: Aug. 21, 2012

(54) DATA TRANSFER METHOD AND PROXY SERVER, AND STORAGE SUBSYSTEM

(75) Inventors: Koji Watanabe, Odawara (JP); Tadashi Takeuchi, Sagamihara (JP); Daisuke Yokota, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1063 days.

(21) Appl. No.: 12/219,503

(22) Filed: Jul. 23, 2008

(65) Prior Publication Data

US 2009/0271526 A1 Oct. 29, 2009

(30) Foreign Application Priority Data

Apr. 24, 2008 (JP) ................................ 2008-114478

(51) Int. Cl.
*G06F 17/30* (2006.01)
(52) U.S. Cl. .................... 707/802; 707/912; 709/236
(58) Field of Classification Search .................. 707/705, 707/740, 803; 709/231, 245, 213, 228; 713/153, 713/187; 370/338
See application file for complete search history.

(56) References Cited

U.S. PATENT DOCUMENTS

| | | | | |
|---|---|---|---|---|
| 6,871,281 B2 * | 3/2005 | Schwab et al. | ................ | 713/187 |
| 7,539,858 B2 * | 5/2009 | Karasawa et al. | ............. | 713/153 |
| 7,724,711 B2 * | 5/2010 | Haumont | ...................... | 370/338 |
| 2005/0102427 A1 | 5/2005 | Yokota et al. | | |
| 2005/0223107 A1 | 10/2005 | Mine et al. | | |
| 2006/0075122 A1 * | 4/2006 | Lindskog et al. | ............. | 709/228 |
| 2006/0112168 A1 * | 5/2006 | Albers et al. | .................. | 709/213 |
| 2007/0282899 A1 * | 12/2007 | Goodman et al. | ............ | 707/803 |

FOREIGN PATENT DOCUMENTS

| | | |
|---|---|---|
| JP | 2004-70860 | 8/2002 |
| JP | 2005-295467 | 4/2004 |

* cited by examiner

*Primary Examiner* — Shahid Alam

(74) *Attorney, Agent, or Firm* — Stites & Harbison, PLLC; Juan Carlos A. Marquez, Esq.

(57) ABSTRACT

A proxy server 10 transfers, when a protocol header and content specified in a distribution request from a client 18 are not stored in a storage device 28, the distribution request to an origin server 12; stores the protocol header and content, which have been transmitted from the origin server 12, in the storage device 28; transmits the protocol header and content to the client 18; creates another protocol header based on the protocol header transmitted from the origin server 12; and stores the created protocol header in the storage device 28. When the protocol header and content specified in the distribution request from the client 18 have been stored in the storage device 28, the proxy server 10 extracts the protocol header and content from the storage device 28 and distributes them to the client 18.

12 Claims, 20 Drawing Sheets

FIG.5A

| CONTENT NAME (66) | PROTOCOL (68) | SIZE (70) |
|---|---|---|
| A | RTSP | 1024 |
| B | RTSP | 10000 |
|  |  |  |

| ORIGINAL PROTOCOL (72) | NEW PROTOCOL (74) |
|---|---|
| HTTP | RTSP |
| RTSP | HTTP |

| CONTENT NAME (76) | POST CONVERSION PROTOCOL (78) | REGISTRATION TIME (80) |
|---|---|---|
|  |  |  |
|  |  |  |
|  |  |  |

| THRESHOLD VALUE OF OPERATION RATE (82) | LONGEST WAIT TIME (84) |
|---|---|
|  |  |

(64)

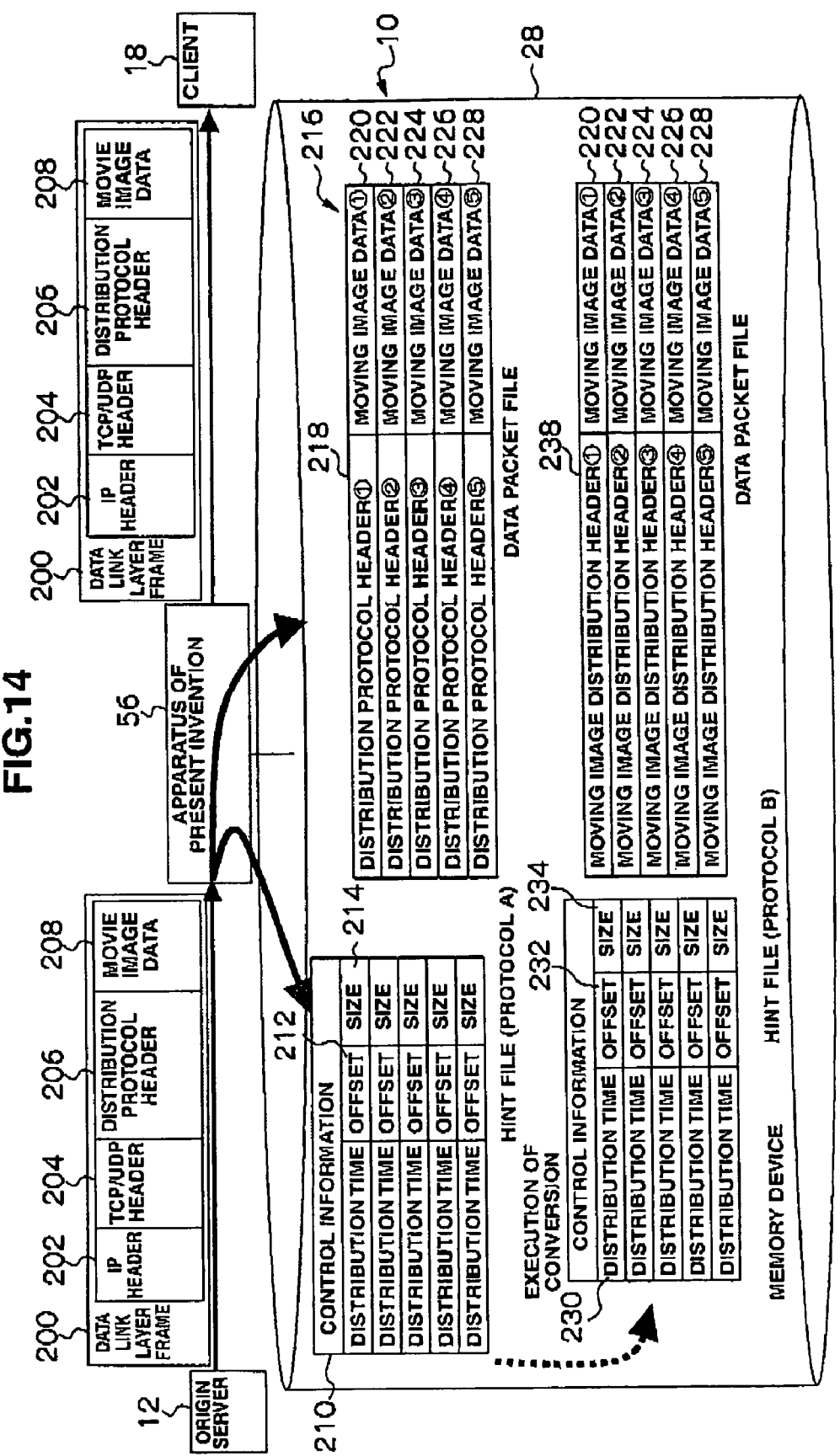

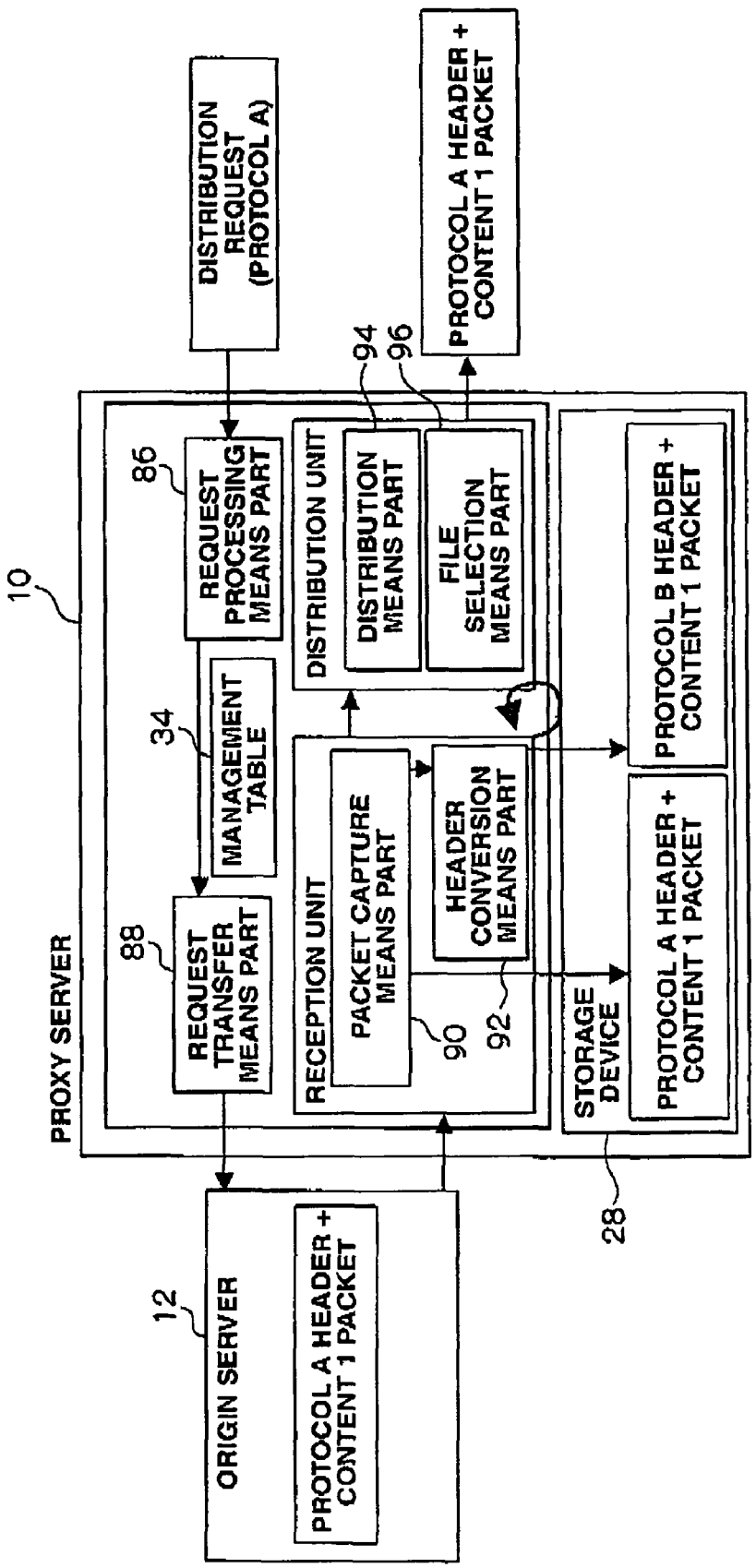

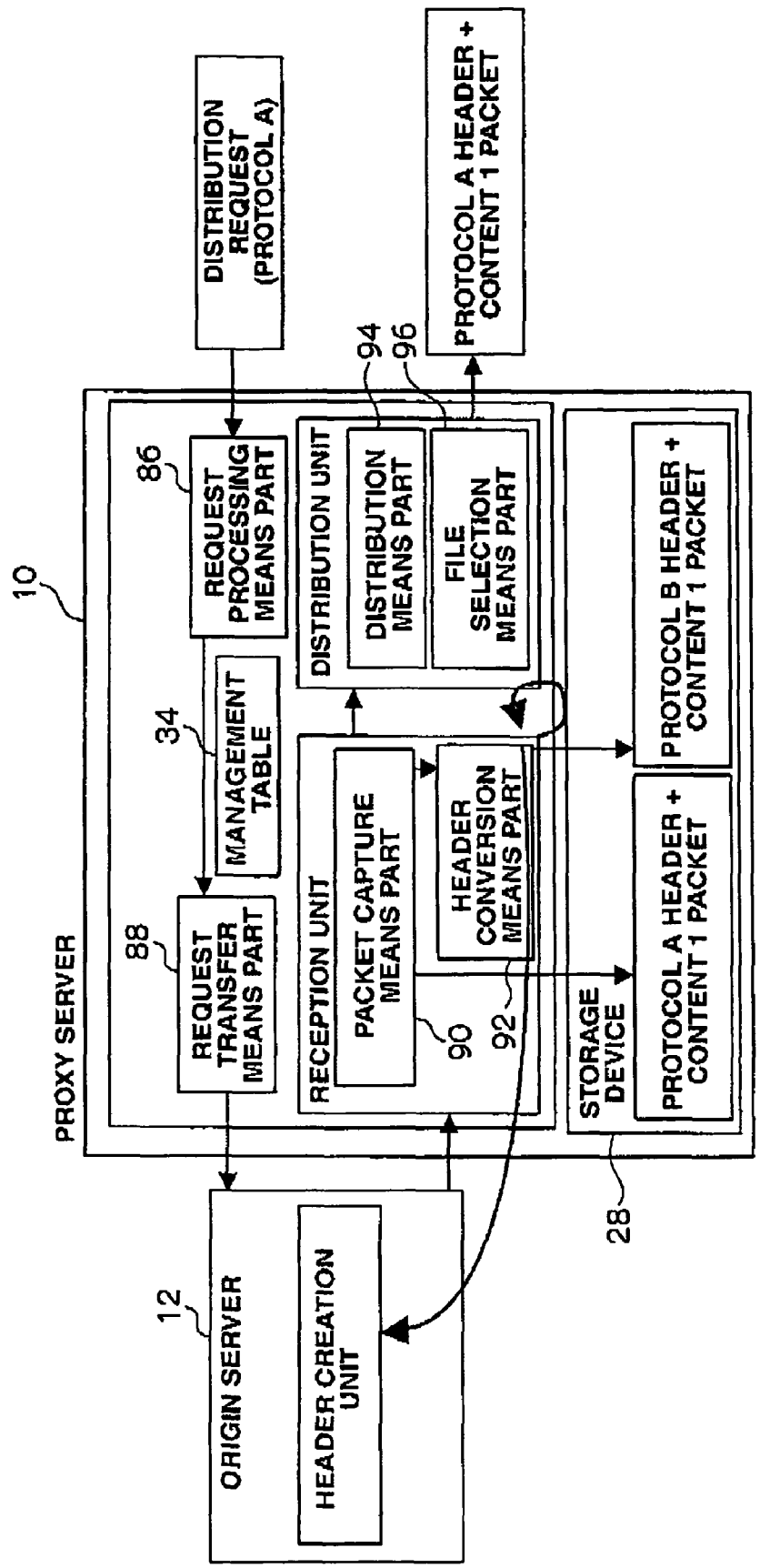

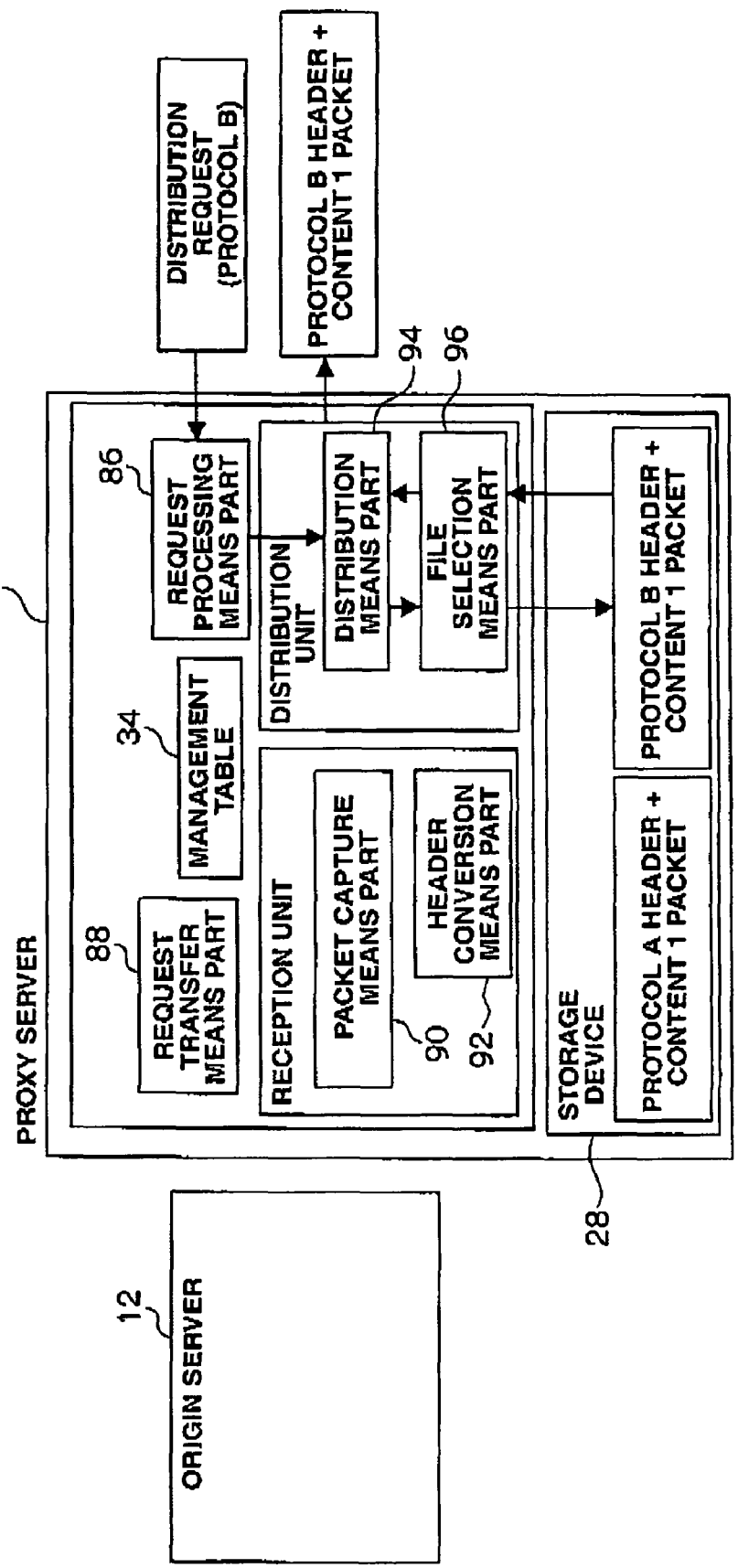

DATA TRANSFER METHOD AND PROXY SERVER, AND STORAGE SUBSYSTEM

CROSS-REFERENCES TO RELATED APPLICATIONS

This application relates to and claims priority from Japanese Patent Application No. 2008-114478, filed on Apr. 24, 2008, the entire disclosure of which is incorporated herein by reference.

BACKGROUND

1. Field of the Invention

The invention relates generally to a technique of distributing content such as video and sound to a client.

2. Description of Related Art

In recent years, with the rapid development of the Internet, the WWW system, in which content that is a file written in HTML (Hyper Text Markup Language) is transferred to a client from a WWW (World Wide Web) server, using HTTP (Hyper Text Transfer Protocol), to display the content via a WWW browser, has been widely utilized.

Also, with broadband lines to normal households and of high-performance PCs (Personal Computers) becoming widespread, a service performing streaming distribution of high-quality and large-capacity video using a network is now realized more easily. In this streaming distribution, a client (client terminal) transmits a request message to a distribution server, and in response, the distribution server transmits video data to the client together with a relevant header. Here, the client can interpret the data to reproduce it.

The current problem of streaming distribution is that a distribution server has throughput limitations. More specifically, there is a limit to the number of distributions for each distribution server. Therefore, in order to distribute content with sufficient quality in response to requests from many clients, plural distribution servers need to be arranged to respond to requests from the clients.

Examples of a method of arranging plural servers include a method of simply arranging servers in parallel and allocating clients' requests to the servers, and a method of, under the control of servers, sharing content files and reading data from the shared content files.

However, these methods cause a reduction in performance due to insufficient storage capacity for storing content and multi-read processing.

From the above, an invention has been proposed in which: a proxy server is provided at the preceding stage of a distribution server (origin server) having original content; content often requested by a client is stored as cache data in the proxy server; and when a request for the same content arrives at the proxy server from the client, the proxy server responds to the client without accessing the origin server and also stores a packet, as cache data, in a storage device connected to the proxy server (see JP2004-070860 A).

Also, an invention has been proposed in which: a proxy server is provided at the preceding stage of an origin server; the proxy server, having received a distribution request from a client, transfers the distribution request to the origin server; the origin server provides a packet in the distribution request with a protocol header, and also distributes the packet provided with the protocol header to the proxy server; the proxy server, having received the packet, changes the destination of the packet transmitted from the origin server to the client and distributes the packet to the client, and also captures a streaming packet; and data (hint file), in which a protocol header, transmission time, etc., are recorded, and content data (packet file) are stored, as cache data, in storage (see JP2005-295467 A).

SUMMARY

An object of the present invention is to provide a data transfer method, a proxy server, and a storage subsystem that can distribute a protocol header and content to a client with reduced processing associated with creation of the protocol header even when the protocol header specified by a distribution request differs for each distribution request.

In order to achieve the above object, the present invention is characterized by including: identifying a distribution request from a client and transferring the distribution request to an origin server provided that a protocol header and content, which are specified in the distribution request, are not stored in a storage unit; storing the protocol header and content, which have been transmitted from the origin server, in the storage unit; transmitting the protocol header and content to the client; creating another protocol header based on the protocol header transmitted from the origin server; associating the created other protocol header with the content and storing the associated protocol header and content in the storage unit; and, when the protocol header and content specified in the distribution request from the client have been stored in the storage unit, distributing the stored protocol header and content to the client.

According to the invention, even when the protocol header specified in the distribution request differs depending on the distribution request, the protocol header and content can be distributed to the client with less processing involved in the protocol header creation.

Other aspects and advantages of the invention will be apparent from the following description and the appended claims.

The former of the above prior art inventions employs a configuration in which only content is stored, as cache data, in a storage device, so a proxy server needs to give content data to a protocol header when distributing the protocol header. As a result, if requests for the same content often reach the proxy server, processing for giving a protocol header to content data occurs for each request, leading to an increase of the load on the proxy server.

Meanwhile, the latter considers the point that the protocol for a packet flowing through a network does not depend on a video distribution protocol. Therefore, the proxy server does not need to have a function of understanding processing specific to the video distribution protocol, and when receiving a request again from a client with the same protocol as that stored as cache data, the proxy server can distribute the requested protocol to the client. However, in the case of a request including the same content but a different protocol, the proxy server needs to acquire a protocol header and data body from the origin server, and as a result, a network band is consumed easily between the origin server and the proxy server.

BRIEF DESCRIPTION OF THE DRAWINGS

FIGS. 5A to 5D are respective structural diagrams of a cache list table, a protocol conversion table, a header conversion queue table, and an overload determination table.

FIG. 14 is a diagram explaining a configuration of a video distribution packet received/transmitted between the origin server, the proxy server, and the client.

FIG. 19 is a structural diagram explaining processing for performing new caching in an overload state.

FIG. 20 is a structural diagram explaining processing for a continuous overload state.

FIG. 21 is a structural diagram explaining processing executed upon receipt of a request including the same content but a different protocol.

DETAILED DESCRIPTION OF PREFERRED EMBODIMENTS

Figure 1:
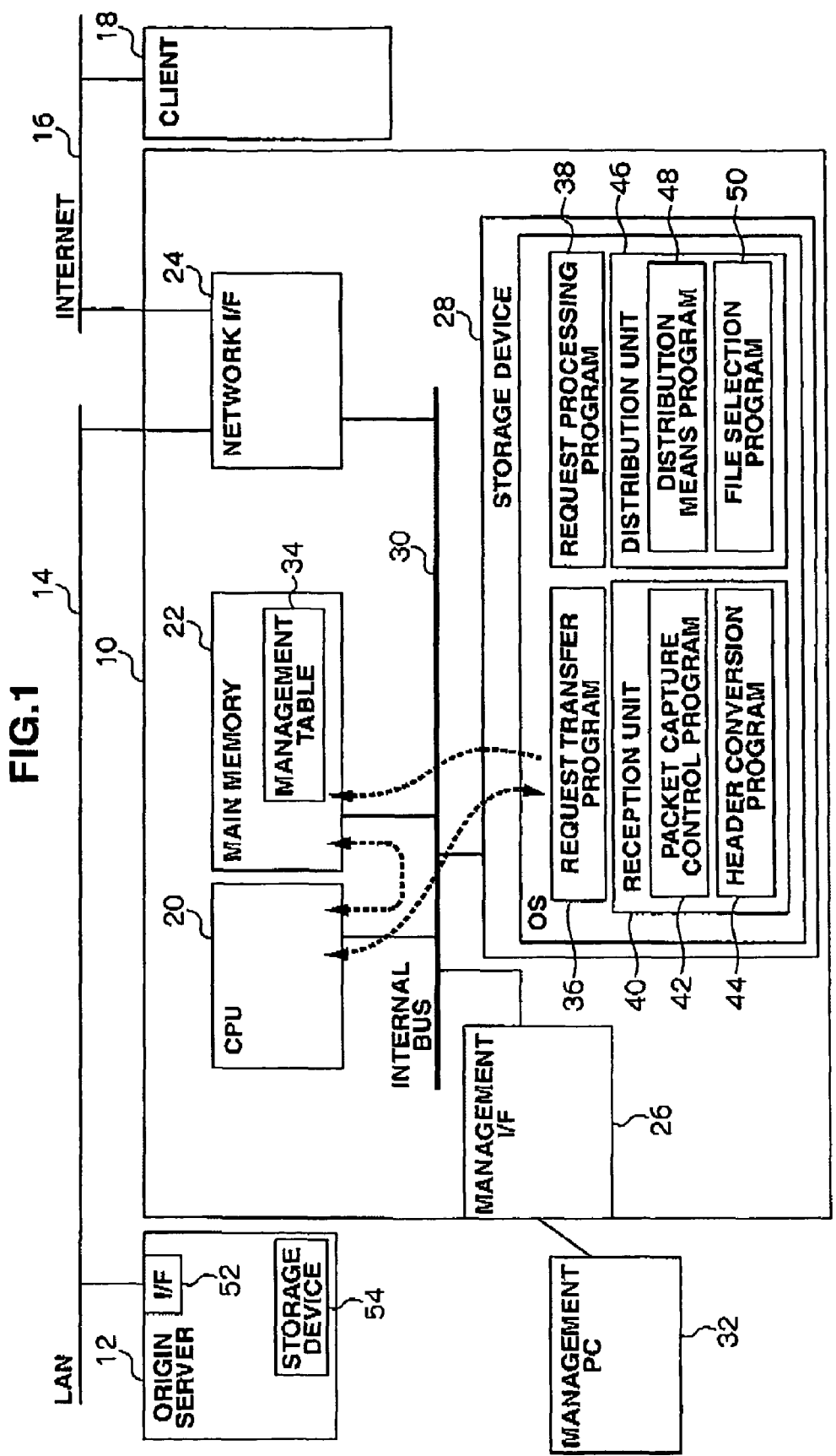
FIG. 1 is block structural diagram of a storage subsystem showing an embodiment of the present invention.

An embodiment of the present invention will be described below with reference to the accompanying drawings. FIG. 1 is block structural diagram of an embodiment of a storage subsystem of the present invention. In FIG. 1, the storage subsystem includes a proxy server 10 and an origin server 12. The proxy server 10 serves as hardware for NAS (Network Attached Storage), and is connected to the origin server 12 via a LAN (Local Area Network) 14 serving as a communication network. The proxy server 10 is also connected to a client (client terminal) 18 via the Internet 16 serving as a communication network.

The proxy server 10 is configured to include a CPU (Central Processing Unit) 20 that controls the entire processing of the proxy server 10, main memory 22 that stores various kinds of information, a network interface 24, a management interface 26, a storage device 28 serving as a storage unit, and an internal bus 30, and the respective parts are connected to one another via the internal bus 30. The network interface 24 is connected to the LAN 14 and the Internet 16, and the management interface 26 is connected to a maintenance management PC 32.

The CPU 20 reads/writes data in the storage device 28 from/to the main memory 22, and executes various kinds of data processing in accordance with programs. Here, the CPU 20 reads a program from the storage device 28, and loads the read program to the main memory 22.

The main memory 22 stores a management table 34. The storage device 28 has an OS (Operating System) that stores: a request transfer program 36 and a request processing program 38; a reception unit 40 including a packet capture control program 42 and a header conversion program 44; and a distribution unit 46 including a distribution means program 48 and a file selection program 50. More specifically, the programs related to the OS are loaded to the main memory 22.

The origin server 12 is configured to include an interface 52 connected to the LAN 14, a storage device 54 storing various programs, and a CPU (not shown in the figure) performing information transfer with the proxy server 10 in accordance with the programs.

Figure 2:
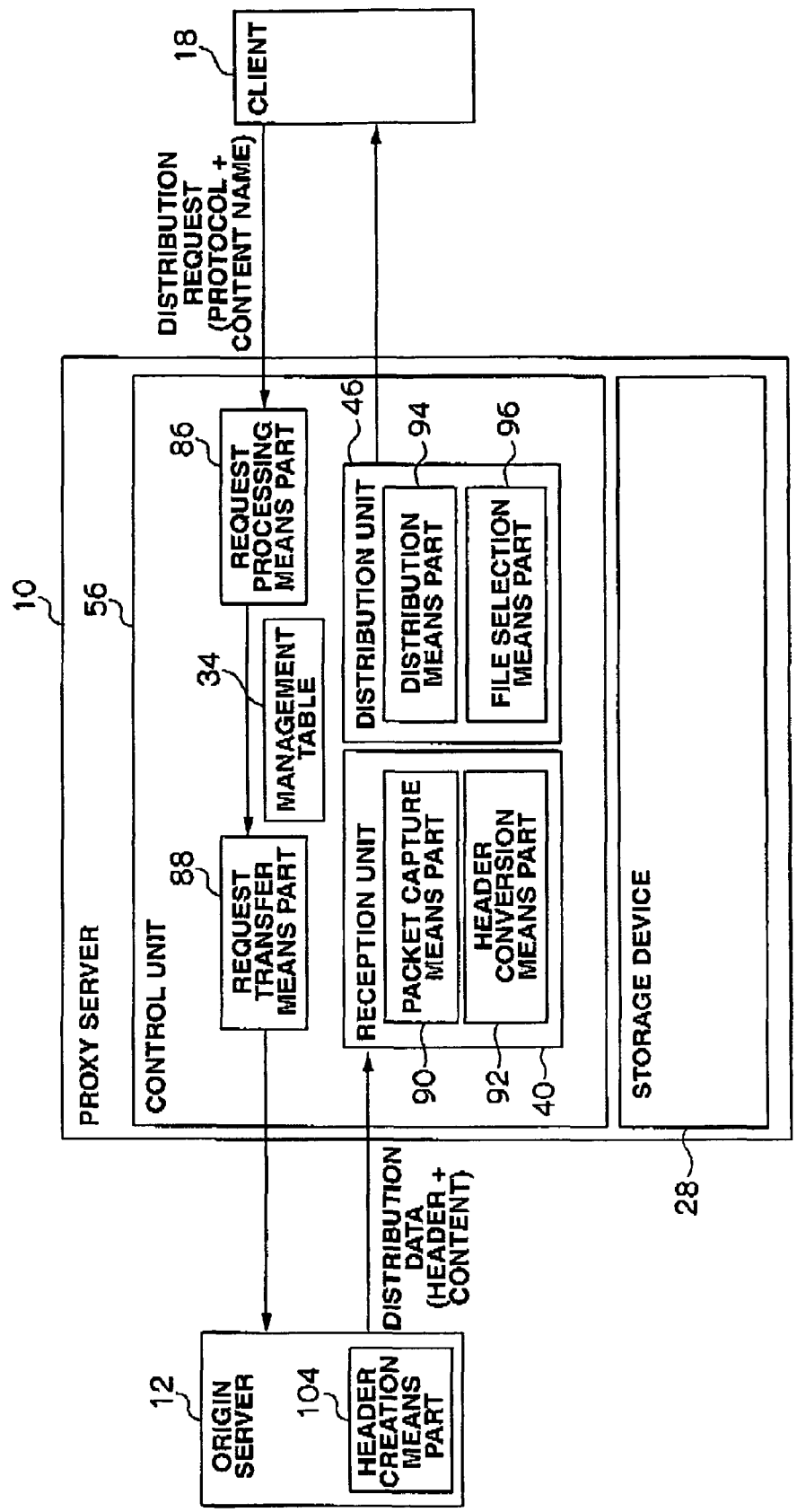
FIG. 2 is a block diagram explaining the relationship between an origin server, a proxy server, and a client.
Figure 3:
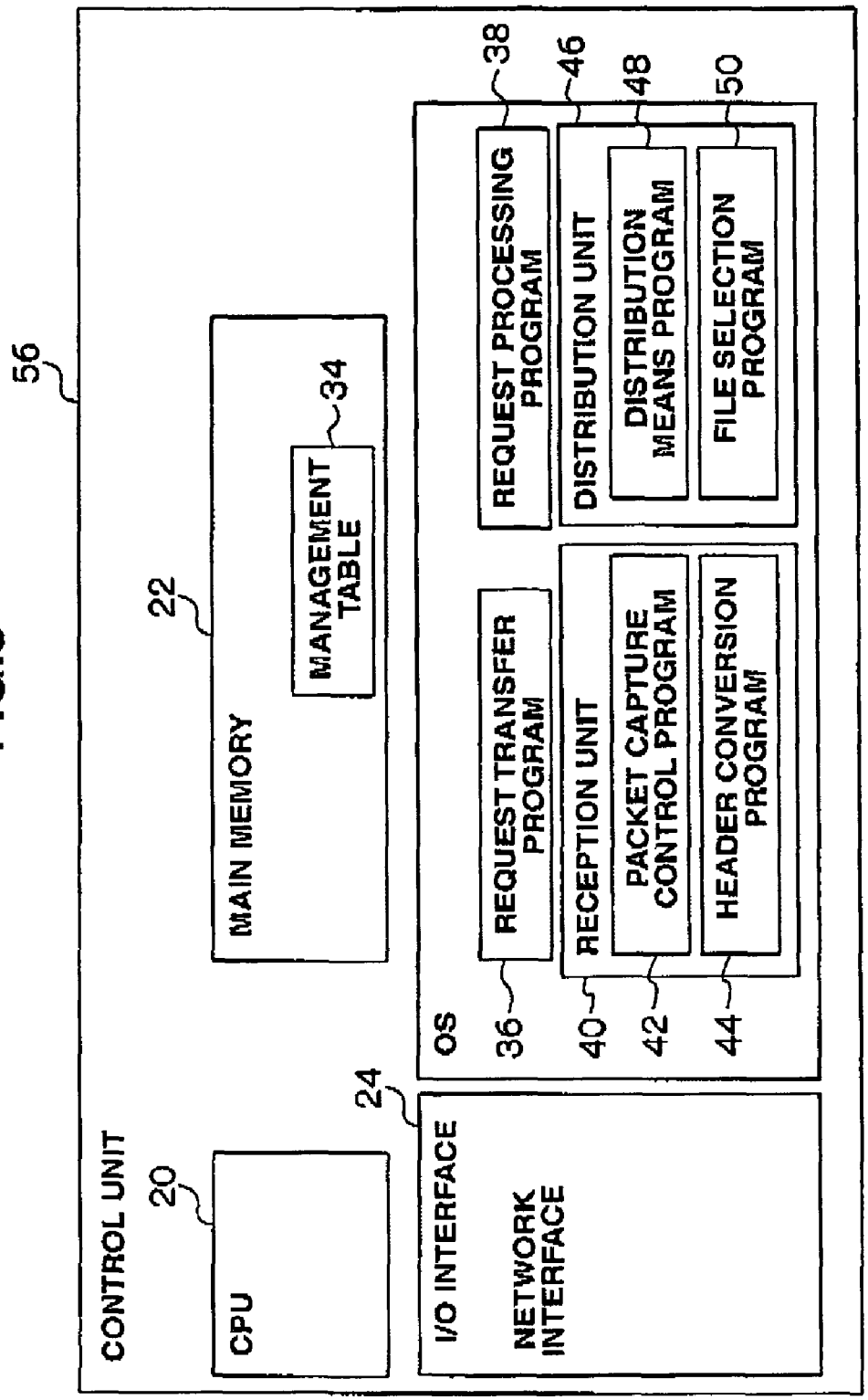
FIG. 3 is a structural diagram of a control unit.
Figure 4:
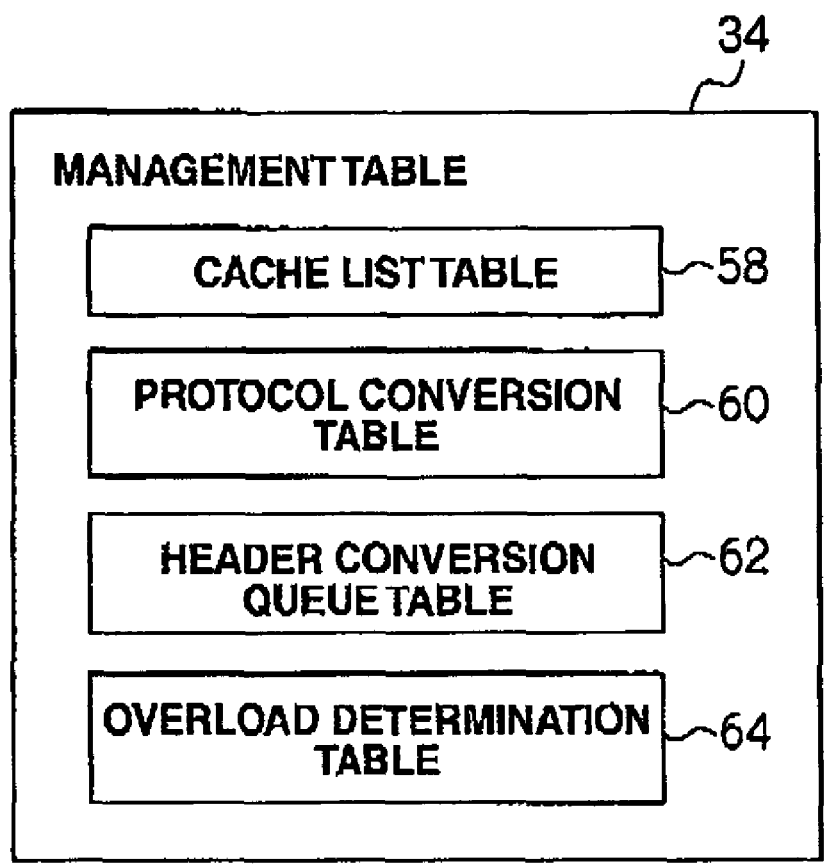
FIG. 4 is a structural diagram of a management table.

The CPU 20, the main memory 22, and the network interface 24 compose a control unit 56, as shown in FIGS. 2 and 3, and the management table 34 stores a cache list table 58, a protocol conversion table 60, a header conversion queue table 62, and an overload determination table 64, as shown in FIG. 4.

The cache list table 58 is configured to include a content name field 66 that stores an identifier for content name, a protocol field 68 that stores a protocol name, and a size field 70 that stores content capacity, as shown in FIG. 5A.

The protocol conversion table 60 is configured to include an original protocol field 72 showing the name of an original protocol and a new protocol field 74 showing the name of a new protocol after conversion, as shown in FIG. 5B.

The header conversion queue table 62 is configured to include a content name field 76 that stores an identifier for content name, a conversion destination protocol field 78 showing a conversion destination protocol, and a registration time field 80 showing a registration time, as shown in FIG. 5C.

The overload determination table 64 is configured to include an operation rate threshold value field 82 that stores a threshold value for an operation rate and a longest wait time field 84 showing the longest wait time used for load determination for implementing header conversion, as shown in FIG. 5D. Note that these tables show examples in which HTTP and RTSP (Real-Time Streaming Protocol) are used as protocols.

Figure 6:
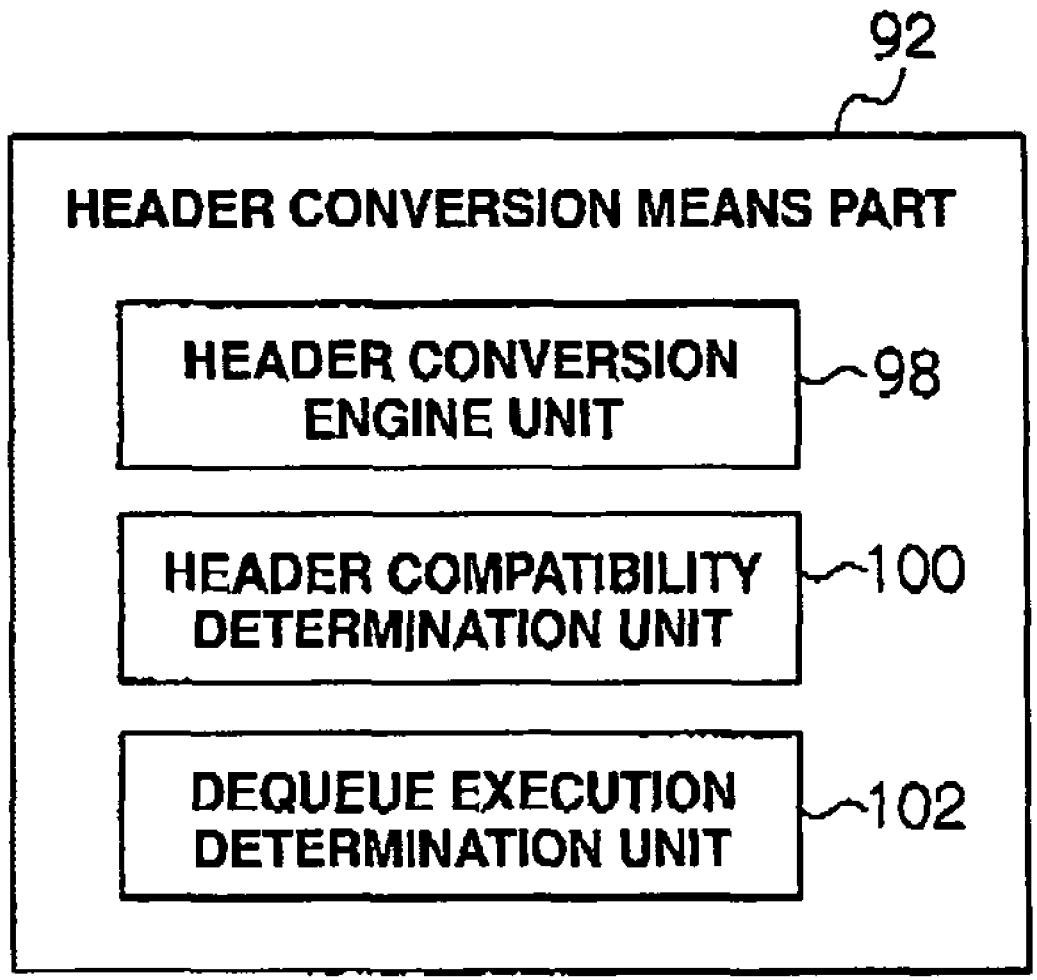
FIG. 6 is a structural diagram of a header conversion means part.

The control unit 56 is provided with the respective functions of a request processing means part 86, a request transfer means part 88, a packet capture means part 90, a header conversion means part 92, a distribution means part 94, and a file selection means part 96. The header conversion means part 92 is provided with the respective functions of a header conversion engine unit 98, a header compatibility determination unit 100, and a dequeue execution determination unit 102, as shown in FIG. 6.

Figure 7:
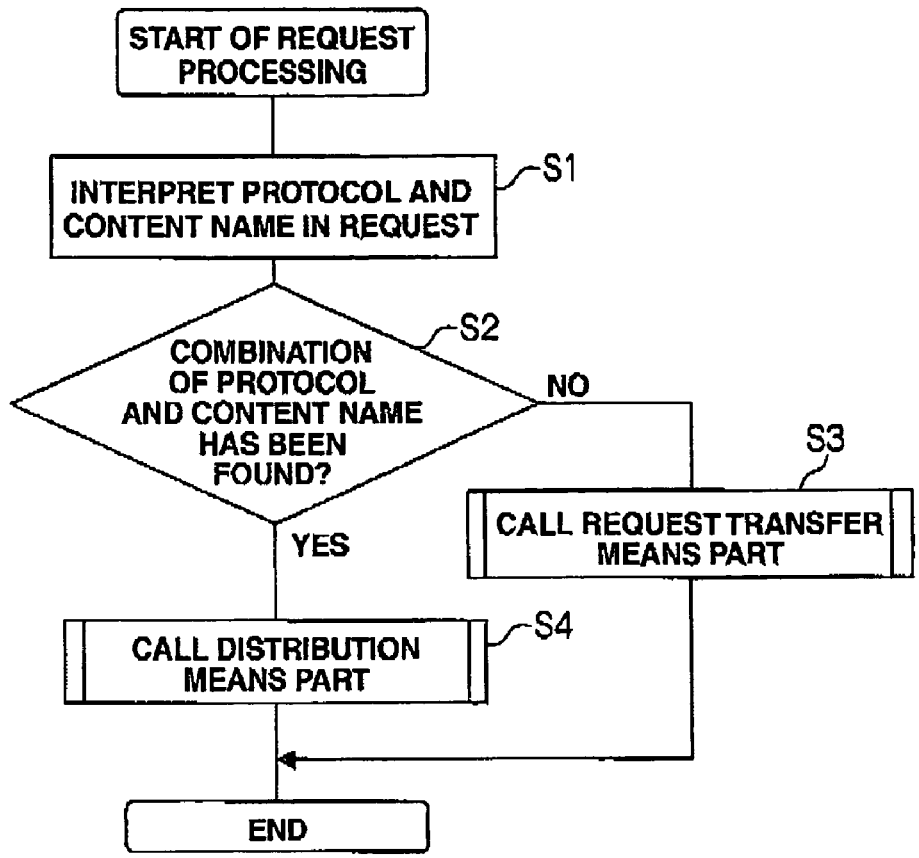
FIG. 7 is a flowchart explaining processing of a request processing means part.

Next, the control unit 56 will be described specifically. First, the processing of the request processing means part 86 will be explained with reference to the flowchart in FIG. 7. As shown in FIG. 7, when receiving a distribution request (protocol+content name) from the client 18, the request processing means part 86 refers to the management table 34, and interprets the protocol and content name specified in the distribution request (S1), and determines whether or not the combination of the protocol and the content is found (S2). If the combination is not found, i.e., if the request processing means part 86 determines that the combination of the protocol and the content is not stored in the storage device 28, it recognizes that the protocol and the content name are not stored as cache data in the storage device 28, calls the request transfer means part 88 (S3), and terminates the processing in this routine.

Meanwhile, when the combination of the protocol and the content is found, the request processing means part 86 recognizes that the protocol and the content are stored as cache data in the storage device 28, calls the distribution means part 94 (S4), and terminates the processing in this routine.

Figure 8:
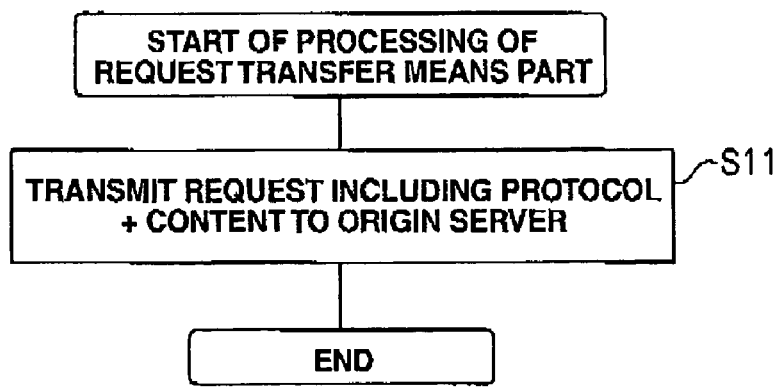
FIG. 8 is a flowchart explaining processing of a request transfer means part.

The request transfer means part 88 recognizes that the combination of the protocol and the content is not stored, as cache data, in the storage device 28, transmits the request for the protocol and the content to the origin server 12 (S11), and terminates the processing in this routine, as shown in FIG. 8.

Then, the origin server 12 responds to an instruction from the request transfer means part 88 to activate a header creation means part 104, creates a header in accordance with the instruction by means of the header creation means part 104, and transmits distribution data, in which the created header is provided with content, to the reception unit 40. The reception unit 40 then executes packet capturing via the processing of the packet capture means part 90.

Figure 9:
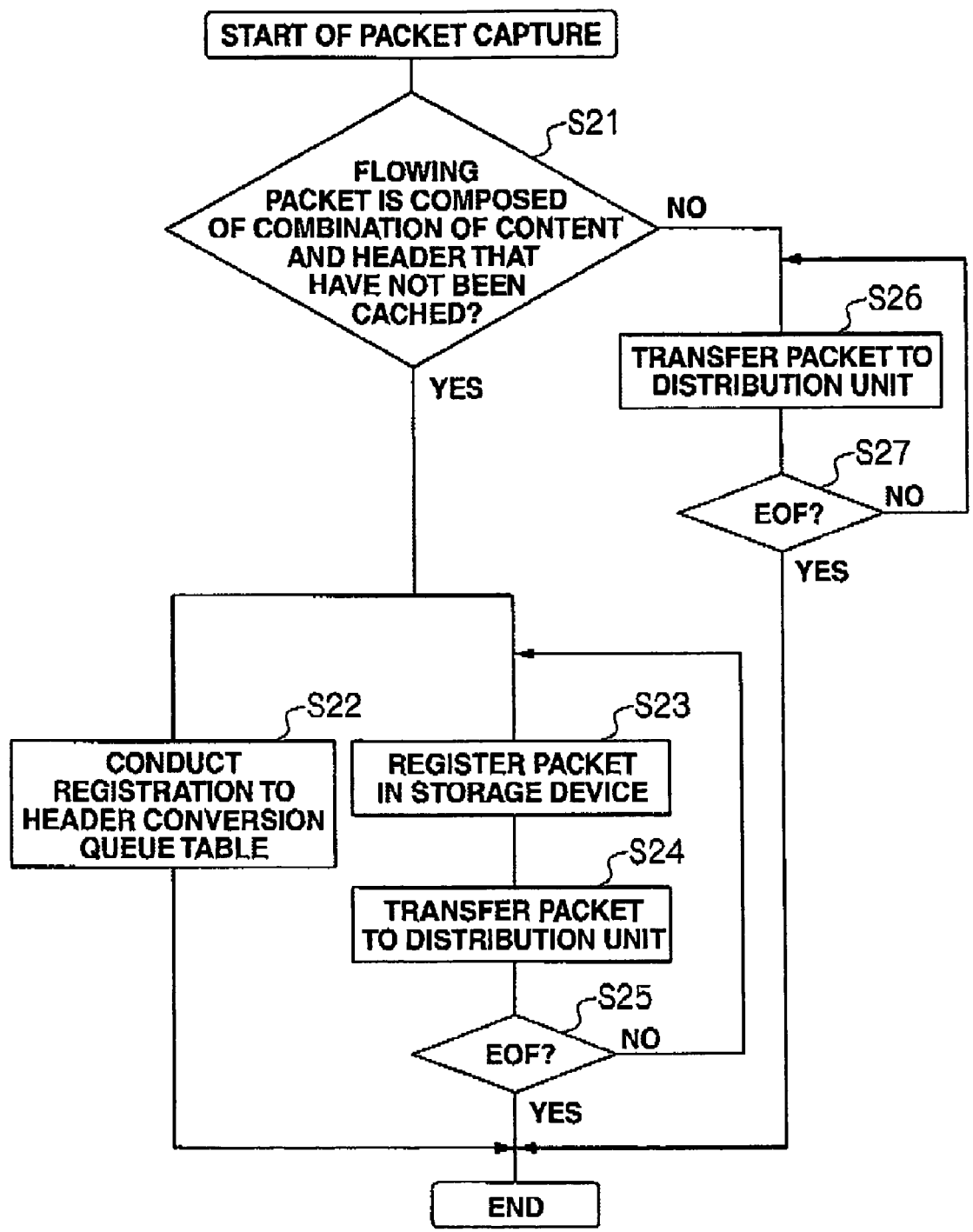
FIG. 9 is a flowchart explaining processing of a packet capture means part.

Specifically, as shown in FIG. 9, the packet capture means part 90 determines whether or not a flowing packet is composed of a combination of content and a header that have not been cached (S21). If the packet capture means part 90 obtains a positive determination result, it registers the relevant content name, conversion destination protocol, and registration time in the header conversion queue table 62 (S22), and also registers the packet in the storage device 28 (S23). The packet capture means part 90 then transfers the packet to the distribution unit 46 (S24), and determines whether or not EOF is reached (End Of File) (S25). The packet capture means part 90 repeats the processing in steps S23 through S25 until EOF is reached, and terminates the processing in this routine when EOF is reached.

Meanwhile, if the packet capture means part 90 obtains a negative determination result in step S21, it transfers the packet to the distribution unit 46 (S26), determines whether or not EOF is reached (S27), and repeats the processing in step S26 until EOF is reached. If EOF is reached, the packet capture means part 90 terminates the processing in this routine.

Figure 10:
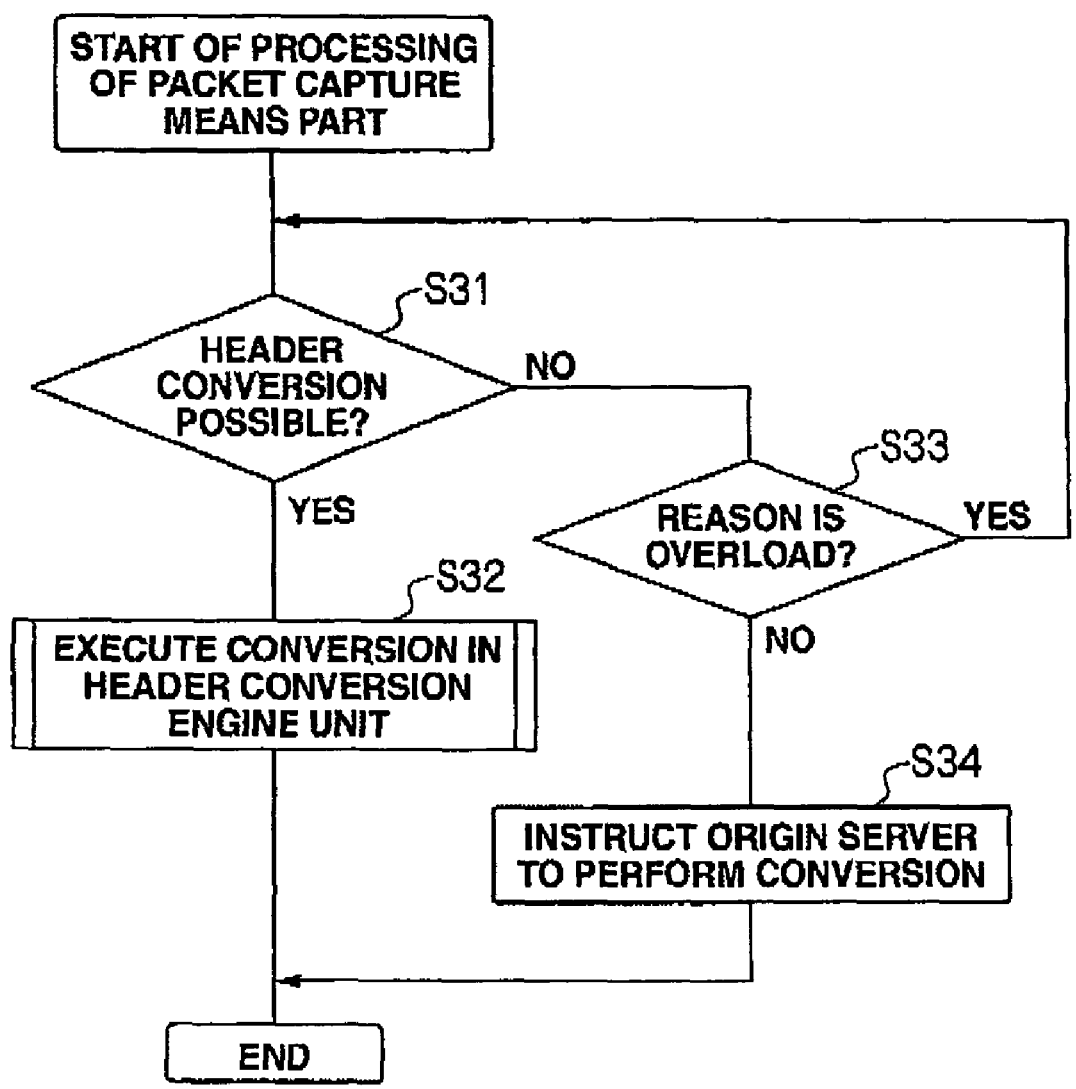
FIG. 10 is a flowchart explaining processing of a header conversion means part.

Next, the processing of the header conversion means part 92 will be described with reference to the flowchart in FIG. 10. In order to create another video distribution protocol header based on the head transmitted from the origin server 12, the header conversion means part 92 refers to the overload determination table 64, and determines whether or not header conversion is possible to be performed based on a load state (S31). When the header conversion means part 92 obtains a positive determination result, it makes the header conversion engine unit 98 to conduct header conversion (S32), and terminates the processing in this routine.

Meanwhile, when the header conversion means part 92 obtains a negative determination result in step S31, it determines whether or not the reason is overload (S33). When the header conversion means part 92 determines that the reason is overload, it returns to the processing in step S31 to wait for the overload to be eliminated. When the header conversion means part 92 determines that the reason is not overload, more specifically, when header conversion is impossible to be conducted even after a set time or in the case of headers difficult to be converted directly, e.g., in the case of switching to the protocol with which header conversion cannot be performed without referring to the whole data, the header conversion means part 92 instructs the origin server 12 to conduct header conversion (S34), and terminates the processing in this routine.

Figure 11:
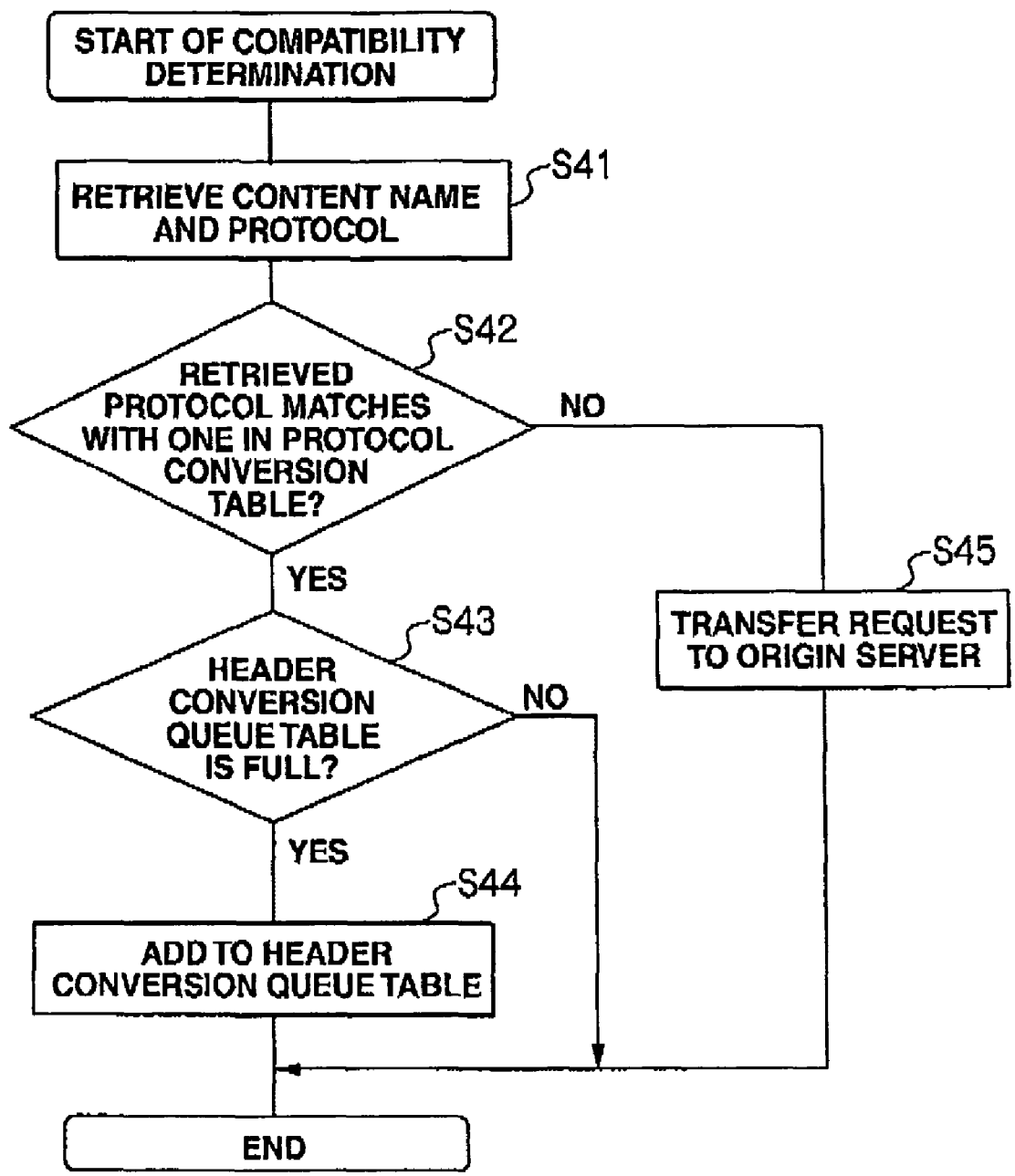
FIG. 11 is a flowchart explaining processing of a header compatibility determination unit.

Next, the processing of the header compatibility determination unit 100 will be described with reference to the flowchart in FIG. 11. The header compatibility determination unit 100 captures the distribution data from the origin server 12, retrieves the content name and protocol from that distribution data (S41), and determines whether or not the retrieved protocol matches with any in the protocol conversion table 60 (S42). When the header compatibility determination unit 100 determines that the protocol retrieved from the distribution data from the origin server 12 matches with one in the protocol conversion table 60, it refers to the header conversion queue table 62 and determines whether or not the header conversion queue table 62 is full (S43). When the header conversion queue table 62 is not full, the header compatibility determination unit 100 adds a conversion destination protocol to the header conversion queue table 62 (S44), and terminates the processing in this routine.

Meanwhile, when the header compatibility determination unit 100 determines that the protocol specified in the distribution request from the client 18 does not match with one in the protocol conversion table 60, it transfers the request to the origin server 12 (S45), and terminates the processing in this routine.

Figure 12:
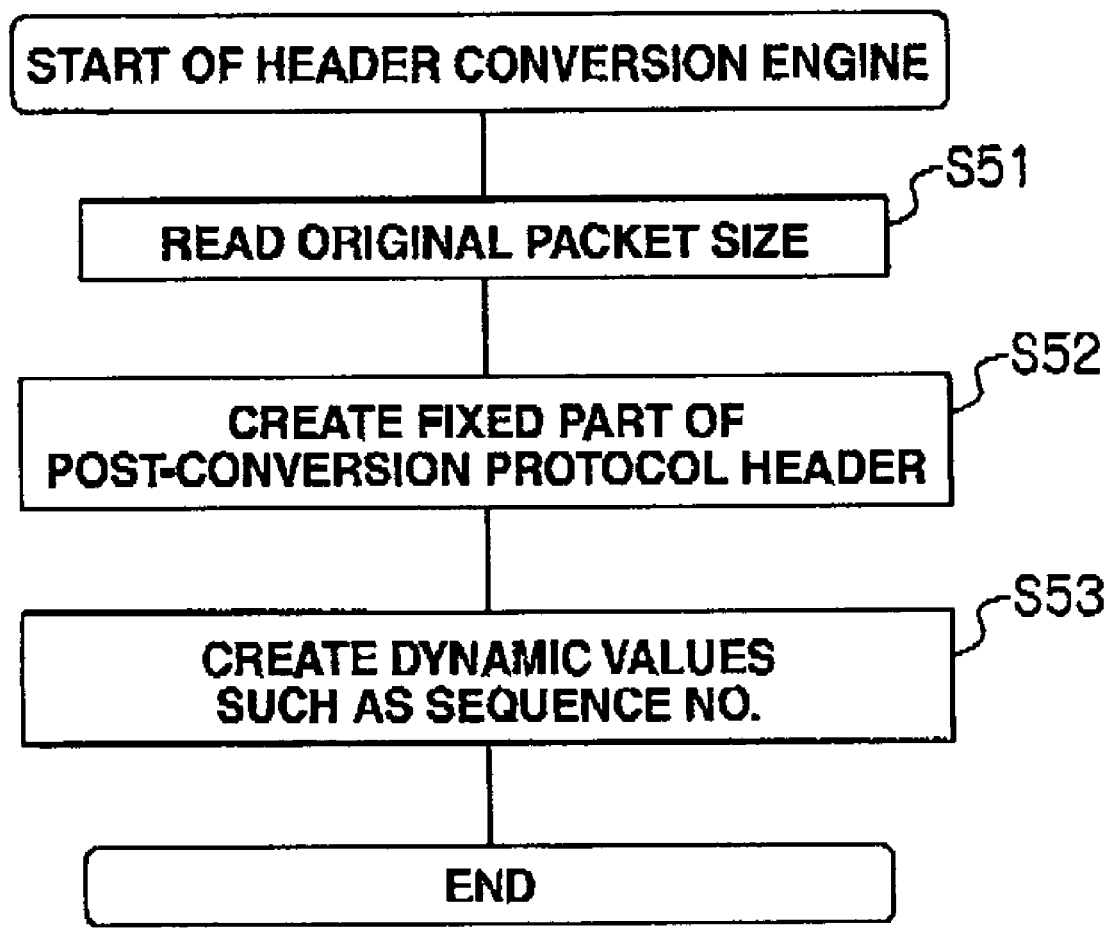
FIG. 12 is a flowchart explaining processing of a header conversion engine unit.

Next, the processing of the header conversion engine unit 98 will be described with reference to the flowchart in FIG. 12. When the header from the origin server 12 can be converted to another video distribution protocol header, the header conversion engine unit 98 reads an original packet size (S51), creates a fixed part of a post-conversion protocol header (S52), creates dynamic values such as a sequence number (S53), and terminates the processing in this routine.

Figure 13:
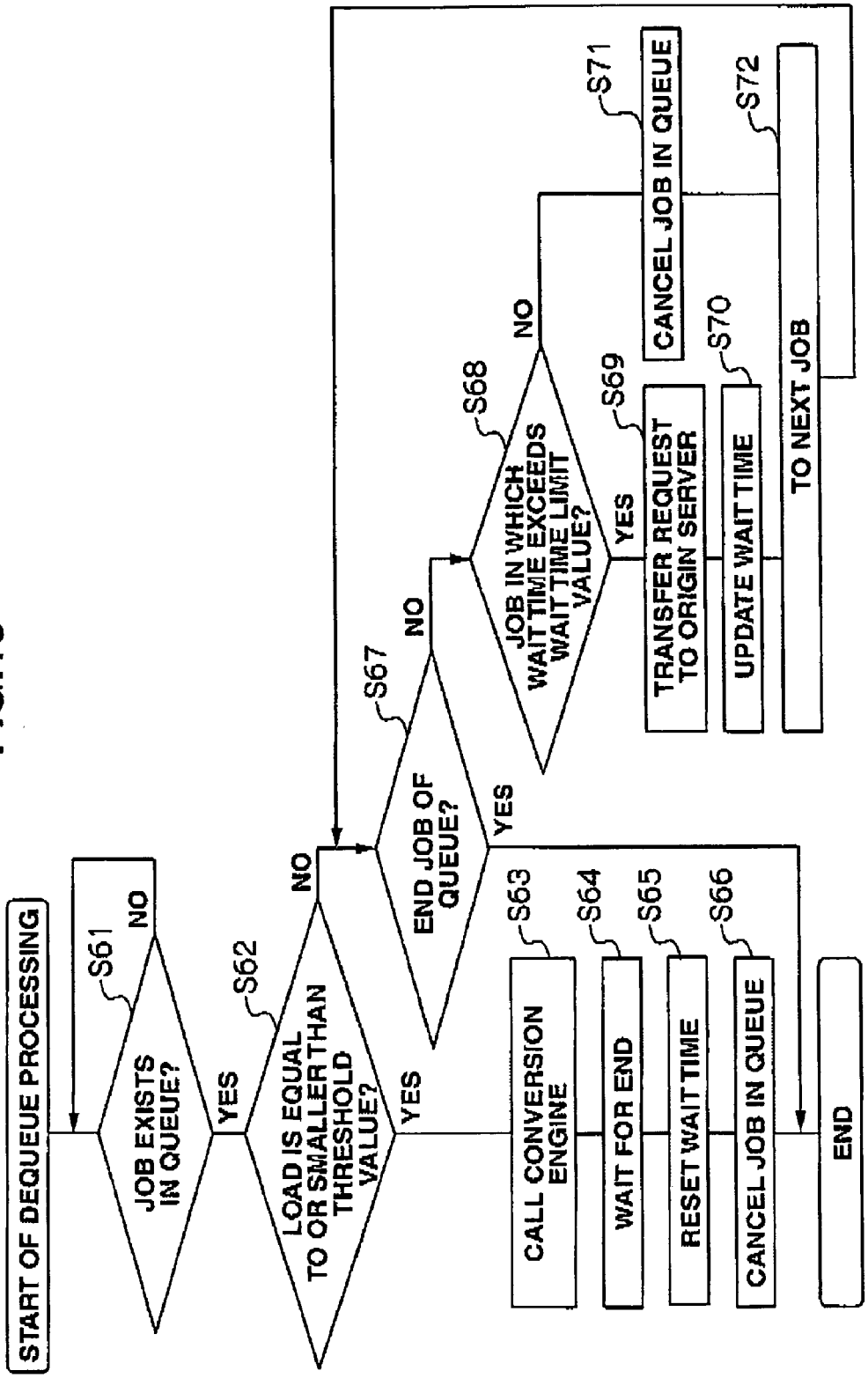
FIG. 13 is a flowchart explaining processing of a dequeue execution determination unit.

Subsequently, the processing of the dequeue execution determination unit 102 will be described with reference to the flowchart in FIG. 13. The dequeue execution determination unit 102 determines whether or not a job exists in a queue (S61), and determines whether or not a load is equal to or smaller than a threshold value provided that a job exists in a queue (S62). When the dequeue execution determination unit 102 determines that a load is equal to or smaller than a threshold value, it calls the header conversion engine unit 98 (S63), waits for the completion of the processing of the header conversion engine unit 98 (S64), resets a wait time (S65), cancels the job in the queue (S66), and terminates the processing in this routine.

Meanwhile, when the dequeue execution determination unit 102 determines that a load is larger than a threshold value, it determines whether or not the job is the end job of the queue (S67). When the dequeue execution determination unit 102 determines that the job is the end of the queue, it terminates the processing in this routine. When the dequeue execution determination unit 102 determines that the job is not the end job of the queue, it determines whether or not the wait time for the job exceeds a wait time limit value (S68). If the dequeue execution determination unit 102 determines that the wait time for the job exceeds a wait time limit value, it transfers the request to the origin server 12 (S69), and cancels the job in the queue (S70). Meanwhile, if the dequeue execution determination unit 102 determines that the wait time for the job does not exceed a wait time limit value, it updates the wait time (S71). The dequeue execution determination unit 102 then executes processing for moving to the next job (S72), and returns to the processing in step S67.

Next, the specific content of packet capture processing and header conversion processing is shown in FIG. 14. Transfer of video distribution packets each of which is composed of a data link layer frame 200 is performed between the origin server 12 and the proxy server 10 and between the proxy server 10 and the client 18. The data link layer frame 200 is composed of an IP (Internet Protocol) header 202, a TCP (Transmission Control Protocol)/UDP (User Datagram Protocol) header 204, a video distribution header 206n, and video data n 208.

Here, the video distribution packet composed of the data link layer frame 200 is divided into packets on a content basis, the content in each packet is given a header, and the resultant packets are transmitted. The content of the video distribution header is determined in accordance with video data, and so can be created in advance. Here, protocol A serving as a hint file is composed of control information including: a distribution time 210; an offset 212 showing the position the relevant file is from the top, and a size 214. A data packet file 216 is composed of video distribution headers 218, #1 video data 220, #2 video data 222, #3 video data 224, #4 video data 226, and #5 video data 228. The proxy server 10 creates protocol B, which is different from protocol A, based on protocol A. Protocol B is composed of control information including a distribution time 230, an offset 232, and a size 234. A data packet file 236 is composed of video distribution headers 238, the #1 data 220, the #2 video data 222, the #3 video data 224, the #4 video data 226, and the #5 video data 228. The protocol A, B is stored as capture data in the storage device 28, and also, is added to the data link layer frame 200 to be distributed to the client 18 when performing packet reconstruction.

Figure 15A:
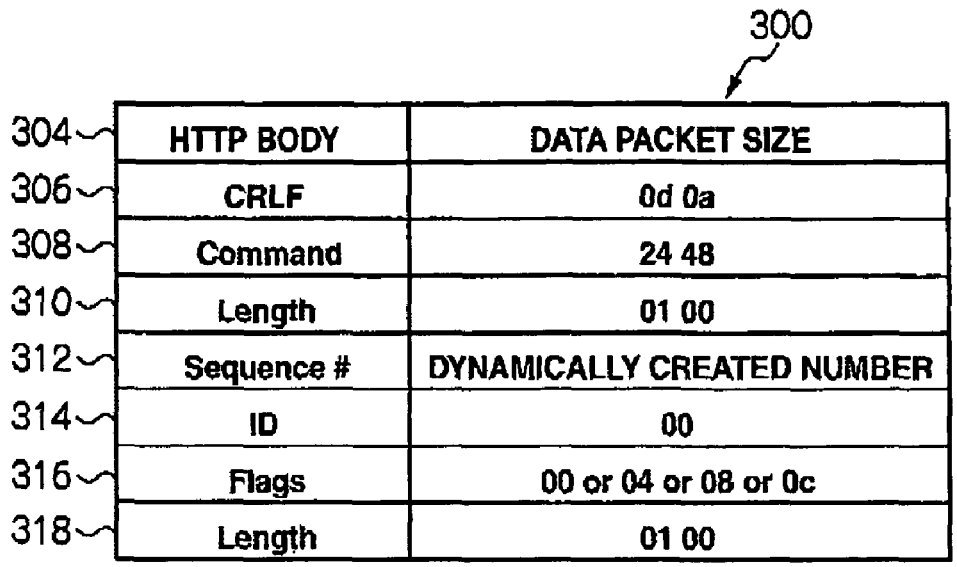
FIGS. 15A and 15B are structural diagrams of an HTTP header and an RTP header.
Figure 15B:
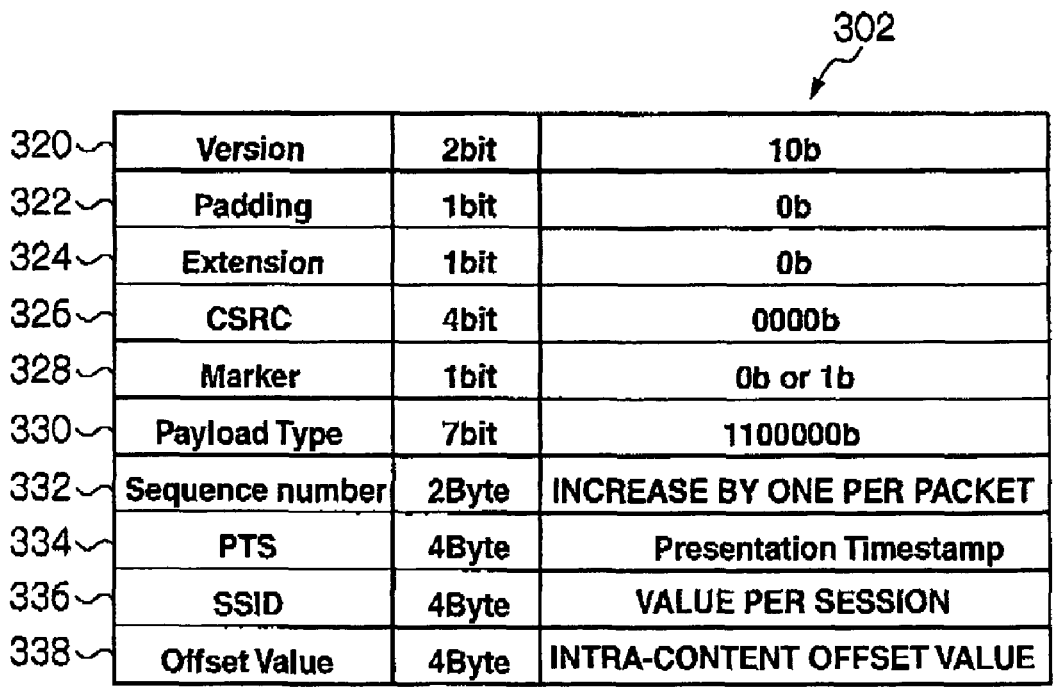

Next, FIGS. 15A and 15B show configurations of an HTTP header 300 and an RTP (Real-time Transport Protocol) header 302.

The HTTP header 300 includes the items of an HTTP body 304, a CRLF 306, a command 308, a length 310, a sequence number 312, an ID 314, a flag 316, and a length 318. The HTTP body 304 stores the data packet size created when a header was created, the sequence number 312 stores the number dynamically created when the header was created, and the flag 316 stores the value of "00," "04," or "08" created when the header was created. Note that the other items each store a fixed value.

The RTP header 302 is composed of respective items of version 320, padding 322, an extension 324, a CSRC (Contributing Source) 326, a marker 328, a payload type 330, a sequence number 332, a PTS (Presentation Time Stamp) 334, an SSID 336, and an offset value 338.

Figure 16:
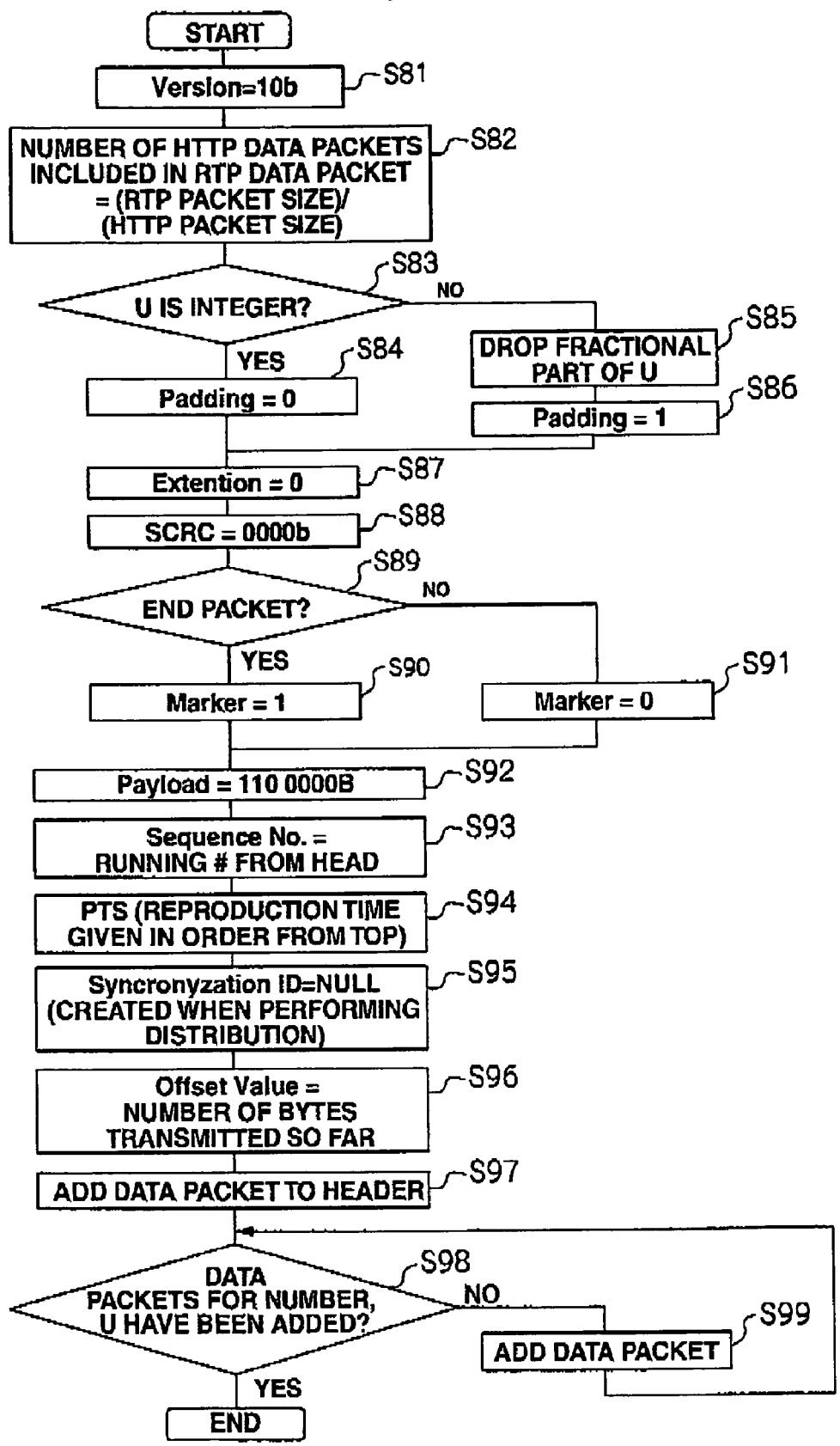
FIG. 16 is a flowchart explaining processing executed when an HTTP header is converted to an RTP header.

Next, the processing executed when a header is converted from an HTTP header to an RTP header will be described with reference to the flowchart in FIG. 16. The header conversion engine unit 98 sets 10b for the version 320 (S81), uses the equation, U being the number of HTTP data packets to be included in an RTP data packet=RTP packet size/HTTP packet size (S82), and determines whether or not U is an integer (S83). If the header conversion engine unit 98 determines that U is an integer, it sets 0 for the padding 322 (S84). When the header conversion engine unit 98 U determines that U is not an integer, it drops the fractional part of U (S85), and sets 1 for the padding 322 (S86). The header conversion engine unit 98 then sets 0 for the extension 324 (S87), sets 0000b for the CSRC 326 (S88), and determines whether or not the relevant packet is the end packet (S89).

After that, the header conversion engine unit 98 sets 1 for the marker 328 if the packet is the end packet (S90), and sets 0 for the marker 328 if the packet is not the end packet (S91). The header conversion engine unit 98 then sets 1100000b for the payload type 330 (S92), sets the relevant running number starting from the top for the sequence number 332 (S93), sets the reproduction time given in order from the top for the PTS 334 (S94), sets Synchronization ID=NULL (S95), sets the number of bytes transmitted so far for the offset value 338 (S96), gives a data packet to a header (S97), and determines whether or not data packets for the number U have been given (S98). If data packets for the number U have been given, the header conversion engine unit 98 terminates the processing in this routine, and in other cases, the header conversion engine unit 98 adds a data packet (S99), and repeats the processing in step S98. As a result, the HTTP header 300 can be converted to the RTP header 302.

Figure 17:
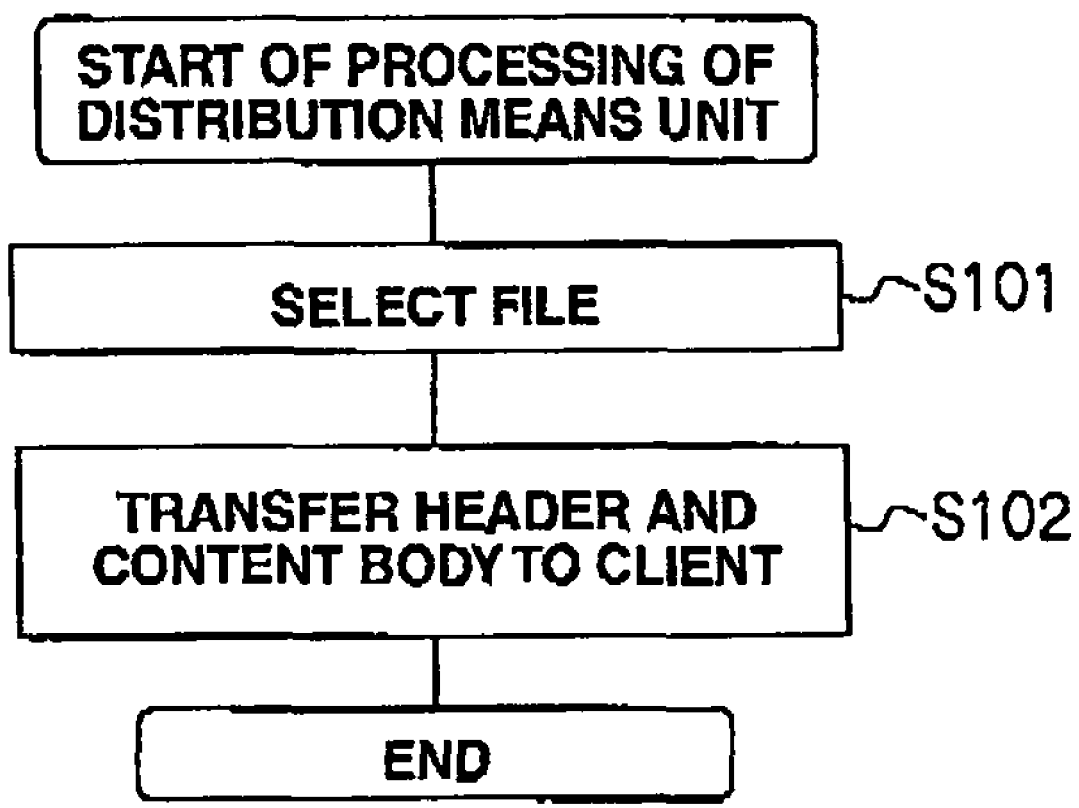
FIG. 17 is a flowchart explaining processing of a distribution means part.

Next, the processing of the distribution means part 94 will be described with reference to the flowchart in FIG. 17. When performing distribution, the distribution means part 94 selects a file from the storage device 28 (S101), distributes (transmits) the relevant headers and content bodies to the client 18 (S102), and terminates the processing in this routine.

Figure 18:
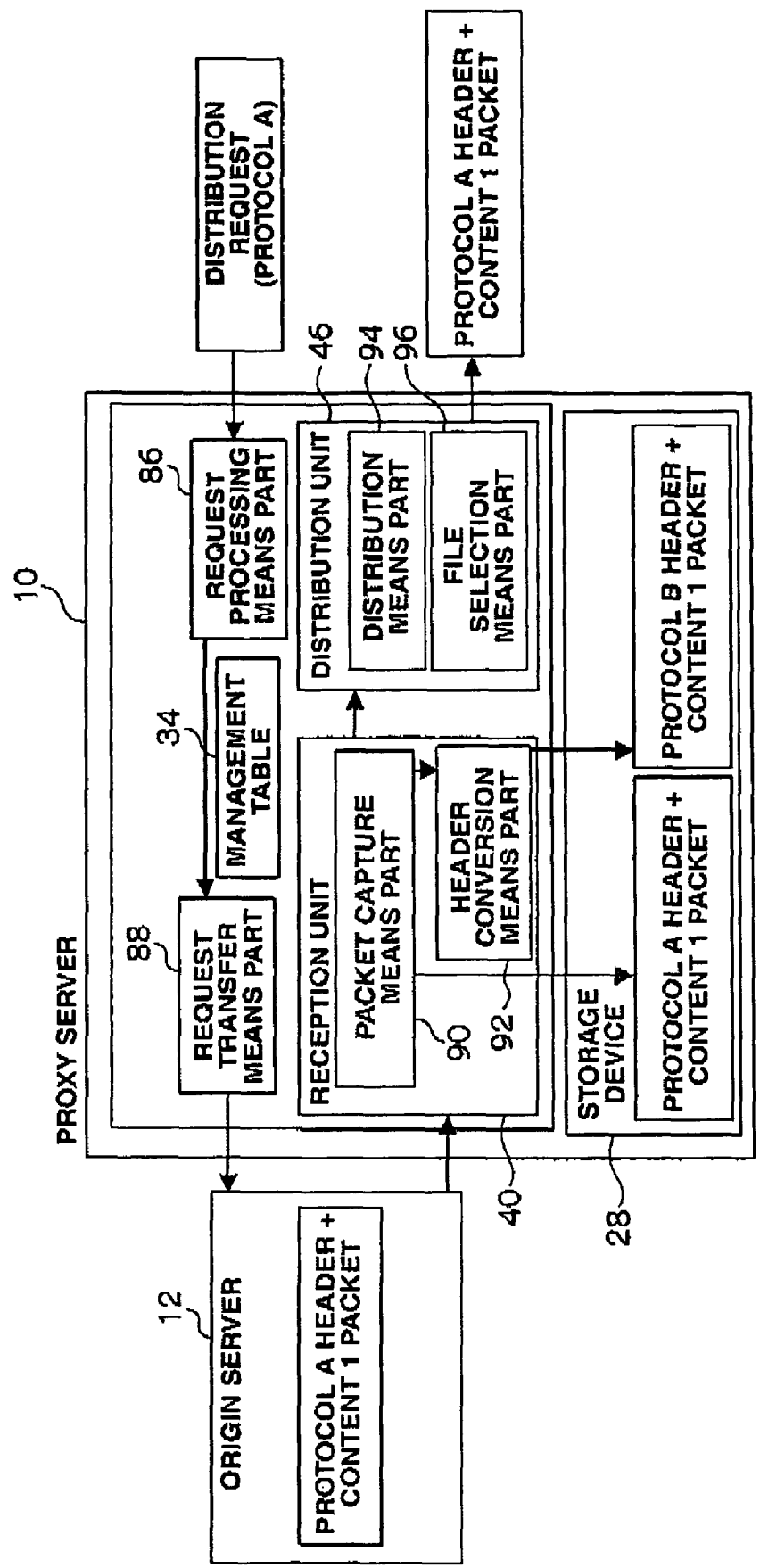
FIG. 18 is a structural diagram explaining processing for performing new caching in a low load state.

Next, the processing for a low load state executed when the proxy server 10 performs storing of cache data in response to a distribution request from the client 18 will be described with reference to FIG. 18. When the distribution request including protocol A and content 1 is transmitted to the proxy server 10 from the client 18, the proxy server 10 activates the request processing means part 86. The request processing means part 86 refers to the management table 34, and when protocol A and content 1 specified in the distribution request do not exist in the storage device 28, the request processing means part 86 transmits the distribution request including content 1 to the origin server 12 from the request transfer means part 88.

When receiving the distribution request from the proxy server 10, the origin server 12 activates the header creation means part 104, creates a header for protocol A, adds content 1 to the created header, and transmits the associated header and content 1 to the proxy server 10.

The proxy server 10 transmits the protocol A header and content 1 to the client 18 from the distribution means part 94. At the same time, the packet capture means part 90 stores the protocol A header and content 1 in the storage device 28, and also registers the relevant header conversion job in the header conversion queue table 62. Here, when the proxy server 10 has a low load involved in the header creation or distribution, the header conversion means part 92 immediately captures the job from the header conversion queue table 62, creates another protocol header, e.g., a protocol B header, adds content 1 to the created protocol B header, and stores that header as other cache data in the storage device 28.

Next, the processing for an overload state will be described with reference to FIG. 19. When the distribution request including protocol A and content 1 is transmitted to the proxy server 10 from the client 18, and when the storage device 28 does not have the protocol A content specified in the distribution request, the proxy server 10 transfers the distribution request to the origin server 12. The processing executed so far is the same as in the case of FIG. 18. However, where the origin server 12 transmits the data in which the protocol A header is provided with content 1 to the proxy server 10 and the proxy server 10 creates another header based on the protocol A header from the origin server 12, the header conversion means part 92 monitors the load state. When the header conversion means part 92 determines that the state is an overload state, it performs capturing for protocol A, and also executes processing for storing conversion jobs in the header conversion queue table 62.

Here, the header conversion means part 92 monitors, at a fixed time interval, whether or not a conversion job exists in a queue, i.e., the state is an overload state, and starts protocol header conversion processing when a conversion job remains in the queue provided that the overload state is resolved. Meanwhile, when the header conversion means part 92 determines that the overload state has been continuing for a time equal to or longer than a given time or set time, it instructs the origin server 12 to create another protocol header, captures the protocol header created in the origin server 12, e.g., the protocol B header, and stores that header as cache data in the storage device 28.

Next, the processing for a continuous overload state will be described with reference to FIG. 20. When the overload state in the proxy server 10 continues, and is not resolved, the header conversion means part 92 instructs the origin server 12 to create a protocol header. Then, when the specified protocol header, e.g., the protocol B header is transferred to the proxy server 10 from the origin server 12, that header is stored as cache data in the storage device 28, together with the content body, which has been stored as cache data in advance in the storage device 28, and the data content is registered in the cache list table 58.

Then, the processing executed upon receipt of a request involving the same content but different protocol from a client will be described with reference to FIG. 21. Where the client 18 transmits a distribution request including different protocol and the same content with respect to the protocol for the protocol A header and content specified in a previous distribution request, e.g., a distribution request including protocol B and content 1, and when the request processing means part 86 determines that the transmitted distribution request includes the same content and the already-cached protocol, it instructs the file selection means 96 to conduct file selection. The file selection means part 96 extracts the data including the protocol B header and content 1 from the storage device 28, and outputs the data to the distribution means part 94. The distribution means part 94 distributes the extracted data including the protocol B header and content 1 to the client 18.

Here, the client 18 interprets the data including the protocol B header and content 1, and starts reproduction of content 1. Note that, when protocol B has not been stored in the storage device 28, the request transfer means part 88 instructs the origin server 12 to create the protocol B header.

By executing the above processing, the data in the proxy server 10 can be used in the case of data including the content but a different header. Here, the storage device 28 stores the data of the protocol A header+content 1 and the data of the protocol B header+content 1, leading to an almost double data amount. Here, a configuration in which: headers are created for respective types of protocol; the created headers and content data are stored in different areas in the storage device 28; and when performing distribution, the header and the content data stored in the respective storage areas are combined to be distributed, can be employed.

According to this embodiment, the proxy server 10: identifies the distribution request from the client 18; and when the protocol header and content specified in the distribution request are not stored in the storage device 28, transfers the distribution request to the origin server 12. The proxy server 10 stores the protocol header and content, which have been transmitted from the origin server 12, in the storage device 28 and transmits the protocol header and content to the client 18; creates another protocol header based on the protocol header transmitted from the origin server 12; and associates the other protocol header with content and stores the associated protocol header and content in the storage device 28. When the protocol header and content specified in the distribution request from the client 18 have been stored in the storage device 28, the proxy server 10 extracts the protocol header and content from the storage device 28 and distributes them to the client 18. Therefore, even when the protocol header specified in the distribution request differs depending on the distribution request, the protocol header and content can be distributed to the client with less processing involved in the protocol header creation.

What is claimed is:

1. A data transfer method being executed in storage subsystem including a control unit performing transfer of information with a client and with an origin server via a communication network and processing the information and a storage unit storing information as a result of processing of the control unit, wherein the control unit:

identifies a distribution request from the client, and, when a protocol header and content specified in the distribution request are not stored in the storage unit, transfers the distribution request to the origin server;

stores the protocol header and content, which have been transmitted from the origin server in response to the transferred distribution request, in the storage unit;

transmits the protocol header and content, which have been transmitted from the origin server in response to the transferred distribution request, to the client;

creates another protocol header based on the protocol header transmitted from the origin server in response to the transferred distribution request or, upon judging that a load state resulting from the creation of the other protocol header is in an overload state for a time equal to or longer than a set time, instructs the origin server to create the other protocol header;

associates the created other protocol header created in the above step with the content and stores the associated protocol header and content in the storage unit;

when the protocol header and content specified in the distribution request from the client are stored in the storage unit, extracts the protocol header and content from the storage unit and distributes them to the client; and upon the other protocol header being created by and receiving from the origin server, transmits the other protocol header created by the origin server and the content serving as content corresponding to the protocol header extracted from the storage unit to the client, associates the other protocol header received from the origin server with the content corresponding to the protocol header, and stores the associated other protocol header and content in the storage unit.

2. The data transfer method according to claim 1, wherein the control unit:

upon creating the other protocol header based on the protocol header transmitted from the origin server, creates a header for each type of protocol;

stores the header created in the above step in a storage area in the storage unit that is different from a storage area for the content; and when it performs distribution to the client, combines the header stored in the storage area different from the storage area for the content with the content and distributes the combined header and content to the client.

3. The data transfer method according to claim 1, wherein the control unit:

creates the other protocol header provided that the load state is not an overload state.

4. A data transfer method being executed in storage subsystem including a control unit performing transfer of information with a client and with an origin server via a communication network and processing the information and a storage unit storing information as a result of processing of the control unit, wherein the control unit:

identifies a distribution request from the client, and, when a protocol header and content specified in the distribution request are not stored in the storage unit, transfers the distribution request to the origin server;

stores the protocol header and content, which have been transmitted from the origin server in response to the transferred distribution request, in the storage unit;

transmits the protocol header and content, which have been transmitted from the origin server in response to the transferred distribution request, to the client;

creates another protocol header based on the protocol header transmitted from the origin server in response to the transferred distribution request;

associates the created other protocol header created in the above step with the content and stores the associated protocol header and content in the storage unit;

when the protocol header and content specified in the distribution request from the client are stored in the storage unit, extracts the protocol header and content from the storage unit and distributes them to the client;

identifies a subsequent distribution request from the client and determines whether or not a protocol header and content, which are specified in the subsequent distribution request, are identical with a protocol header and content specified in a previous distribution request;

when it determines, in the above step, that the protocol headers differ, but the content is the same, conducts retrieval for the storage unit;

when the retrieval in the above step reveals that the protocol header and content specified in the subsequent distribution request are extracted from the storage unit, distributes the extracted protocol header and content to the client; and when the retrieval in the above step reveals that the protocol header and content specified in the subsequent distribution request do not exist in the storage unit, instructs the origin server to create the protocol header specified in the subsequent distribution request.

5. A proxy server comprising:

a control unit performing transfer of information with a client and with an origin server via a communication network and processing the information; and a storage unit storing information as a result of processing in the control unit, wherein:

the control unit identifies a distribution request from the client, and, when a protocol header and content specified in the distribution request are not stored in the storage unit, transfers the distribution request to the origin server;

the control unit stores a protocol header and content, which have been transmitted from the origin server in response to the transferred distribution request, in the storage unit and transmits the protocol header and content to the client;

the control unit creates another protocol header based on the protocol header transmitted from the origin server in response to the transferred distribution request or, upon judging that a load state resulting from the creation of the other protocol header is in an overload state for a time equal to or longer than a set time, instructs the origin server to create the other protocol header;

the control unit associates the created other protocol header created with the content and stores the associated protocol header and content in the storage unit;

when the protocol header and content specified in the distribution request from the client are stored in the storage unit, the control unit extracts the protocol header and content from the storage unit and distributes them to the client; and upon the other protocol header being created by and receiving from the origin server, the control unit transmits the other protocol header created by the origin server and the content serving as content corresponding to the protocol header extracted from the storage unit to the client, associates the other protocol header received from the origin server with the content corresponding to the protocol header, and stores the associated other protocol header and content in the storage unit.

6. The proxy server according to claim 5, wherein:

when the control unit, upon creating the other protocol header based on the protocol header transmitted from the origin server, creates a header for each type of protocol;

the control unit stores the created header in a storage area in the storage unit different from a storage area for the content; and when the control unit performs distribution to the client, it combines the header stored in the storage area different from the storage area for the content with the content and distributes the resultant to the client.

7. The proxy server according to claim 5, wherein:

the control unit creates the other protocol header provided that the load state is not an overload state.

8. A proxy server, comprising:

a control unit performing transfer of information with a client and with an origin server via a communication network and processing the information; and a storage unit storing information as a result of processing in the control unit, wherein:

the control unit identifies a distribution request from the client, and, when a protocol header and content specified in the distribution request are not stored in the storage unit, transfers the distribution request to the origin server;

the control unit stores a protocol header and content, which have been transmitted from the origin server in response to the transferred distribution request, in the storage unit and transmits the protocol header and content to the client;

the control unit creates another protocol header based on the protocol header transmitted from the origin server;

the control unit associates the created other protocol header created with the content and stores the associated protocol header and content in the storage unit;

when the protocol header and content specified in the distribution request from the client are stored in the storage unit, the control unit extracts the protocol header and content from the storage unit and distributes them to the client;

the control unit identifies a subsequent distribution request from the client and determines whether or not a protocol header and content, which are specified in the subsequent distribution request, are identical with a protocol header and content specified in a previous distribution request;

when the control unit determines that the protocol headers differ, but the content is the same, it conducts retrieval for the storage unit;

when the retrieval reveals that the protocol header and content specified in the subsequent distribution request are extracted from the storage unit, the control unit distributes the extracted protocol header and content to the client; and when the retrieval reveals that the protocol header and content specified in the subsequent distribution request do not exist in the storage unit, the control unit instructs the origin server to create the protocol header specified in the subsequent distribution request.

9. A storage subsystem comprising:
a proxy server performing transfer of information with a client via a communication network; and
an origin server performing transfer of information with the proxy server via a communication network different from the communication network,
wherein:
the proxy server includes a storage unit, serving as storage, composed of a storage device;
the proxy server identifies a distribution request from the client, and, when a protocol header and content specified in the distribution request are not stored in the storage unit, transfers the distribution request to the origin server;
the proxy server stores a protocol header and content, which have been transmitted from the origin server in response to the transferred distribution request, in the storage unit and transmits the protocol header and content to the client;
the proxy server creates another protocol header based on the protocol header transmitted from the origin server in response to the transferred distribution request or, upon judging that a load state resulting from the creation of the other protocol header is in an overload state for a time equal to or longer than a set time, instructs the origin server to create the other protocol header;
the origin server, upon being instructed by the proxy server to create the other protocol header, creates the protocol header in response and transmits the created protocol header to the proxy server;
the proxy server associates the created other protocol header with the content and stores the associated protocol header and content in the storage unit;
when the protocol header and content specified in the distribution request from the client are stored in the storage unit, the proxy server extracts the protocol header and content from the storage unit and distributes them to the client;
the origin server, upon creating the protocol header specified in the distribution request in response to the distribution request transferred from the proxy server, adds the content specified in the distribution request to the created protocol header and transmits the resultant to the proxy server; and
the proxy server, upon the other protocol header being created by and receiving from the origin server, transmits the other protocol header created by the origin server and the content serving as content corresponding to the protocol header extracted from the storage unit to the client, associates the other protocol header received from the origin server with the content corresponding to the protocol header, and stores the associated other protocol header and content in the storage unit.

10. The storage subsystem according to claim 9, wherein:
upon creating the other protocol header based on the protocol header transmitted from the origin server, the proxy server creates a header for each type of protocol;
the proxy server stores the created header in a storage area in the storage unit different from a storage area for the content; and
when the proxy server performs distribution to the client, it combines the header stored in the storage area different from the storage area for the content with the content and distributes the resultant to the client.

11. The storage subsystem according to claim 9, wherein:
the proxy server creates the other protocol header provided that the load state is not an overload state.

12. A storage subsystem, comprising:
a proxy server performing transfer of information with a client via a communication network; and
an origin server performing transfer of information with the proxy server via a communication network different from the communication network,
wherein:
the proxy server includes a storage unit, serving as storage, composed of a storage device;
the proxy server identifies a distribution request from the client, and, when a protocol header and content specified in the distribution request are not stored in the storage unit, transfers the distribution request to the origin server;
the proxy server stores a protocol header and content, which have been transmitted from the origin server in response to the transferred distribution request, in the storage unit and transmits the protocol header and content to the client;
the proxy server creates another protocol header based on the protocol header transmitted from the origin server;
the proxy server associates the created other protocol header with the content and stores the associated protocol header and content in the storage unit;
when the protocol header and content specified in the distribution request from the client are stored in the storage unit, the proxy server extracts the protocol header and content from the storage unit and distributes them to the client;
the origin server creates the protocol header specified in the distribution request in response to the distribution request transferred from the proxy server, adds the content specified in the distribution request to the created protocol header and transmits the resultant to the proxy server;
the proxy server identifies a subsequent distribution request from the client and determines whether or not a protocol header and content, which are specified in the subsequent distribution request, are identical with a protocol header and content specified in a previous distribution request;
when the proxy server determines that the protocol headers differ, but the content is the same, it conducts retrieval for the storage unit;
when the retrieval reveals that the protocol header and content specified in the subsequent distribution request are extracted from the storage unit, the proxy server distributes the extracted protocol header and content to the client;
when the retrieval reveals that the protocol header and content specified in the subsequent distribution request do not exist in the storage unit, the proxy server instructs the origin server to create the protocol header specified in the subsequent distribution request; and
the origin server creates the protocol header based on the instruction in response to the instruction from the proxy server, and transmits the created protocol header to the proxy server.

* * * * *